United States Patent Office 3,806,518
Patented Apr. 23, 1974

3,806,518
2-AMINO-1-(2-IMIDAZOLIN-2-YL)-
2-IMIDAZOLINES
Raymond R. Wittekind, Morristown, and John Shavel, Jr., Mendham, N.J., assignors to Warner-Lambert Company, Morris Plains, N.J.
No Drawing. Continuation-in-part of application Ser. No. 6,639, Jan. 28, 1970, now Patent No. 3,666,767, dated May 30, 1972. This application Feb. 22, 1972, Ser. No. 228,361
Int. Cl. C07d 49/34
U.S. Cl. 260—309.6
6 Claims

ABSTRACT OF THE DISCLOSURE

The present invention relates to 2-amino - 1 - (2-imidazolin-2-yl) - 2 - imidazolines, the free base of which has the following structural formulas:

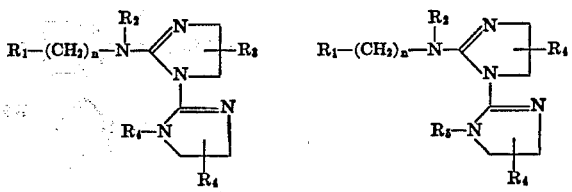

wherein $R_1$ is hydrogen, lower alkyl, cycloalkyl, aryl, substituted aryl, heterocyclic, substituted heterocyclic or aryloxy;
$R_2$ is hydrogen, lower alkyl, aryl and substituted aryl; or $R_1$ and $R_2$ taken together with the nitrogen atom to which they are attached form a heterocyclic ring;
$R_3$ and $R_4$ are hydrogen, lower alkyl, aryl, or substituted aryl;
$R_5$ is hydrogen, lower alkyl, aryl or substituted aryl;
$n$ is an integer from 0 to 10.

The compounds of this invention are useful as anti-arrhythmic agents as well as antibacterial agents.

This application is a continuation-in-part application of our copending application, U.S. Ser. No. 6,639, filed Jan. 28, 1970, now U.S. Pat. No. 3,666,767, issued May 30, 1972.

The present invention relates to 2-amino - 1 - (2-imidazolin-2-yl) - 2 - imidazolines having the following structural formulas:

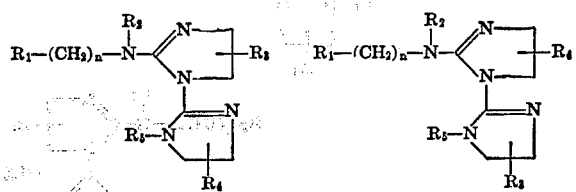

wherein $R_1$ is hydrogen, lower alkyl, cycloalkyl, heterocyclic, substituted heterocyclic, aryl, substituted aryl, or aryloxy;
$R_2$ is hydrogen, lower alkyl, aryl, substituted aryl, or $R_1$ and $R_2$ taken together with the nitrogen atom to which they are attached form a heterocyclic ring, for example, a 5- or 6-membered ring;
$R_3$ and $R_4$ are hydrogen, lower alkyl, aryl or substituted aryl;
$R_5$ is hydrogen, lower alkyl, aryl or substituted aryl;
$n$ is an integer from 0 to 10.

In the definitions for $R_1$, $R_2$, $R_3$, $R_4$, and $R_5$, the term "lower alkyl" includes lower aliphatic hydrocarbons having 1 to 10 carbon atoms in the carbon chain. It includes straight chain as well as branched chain radicals. The term also includes, for example, methyl, ethyl, propyl, isopropyl, butyl, isobutyl and the like. The term "cycloalkyl" encompasses saturated monocyclic groups having from 3 to 8 carbon atoms, such as cyclopropyl, cyclobutyl, cyclopentyl, cyclohexyl, cycloheptyl, and cyclooctyl. The term "heterocyclic" encompasses the monocyclic 5- and 6-membered hetero rings having at least one hetero atoms in the ring which may be either nitrogen, oxygen or sulfur. Representative heterocyclics falling within this definition are, for example, aziridinyl, azetedinyl, pyrrolyl, pyrrolidinyl, morpholino, thienyl, furyl, pyridyl, piperidyl, indolyl, and the like. Additionally, these 5- and 6-membered heterocyclics may have further substituents in their ring portions by groups such as, hydrogen, halogen, lower alkyl and lower alkoxy. The term "aryl" denotes a monocyclic or bicyclic hydrocarbon radical, preferably of 6 to 10 carbon atoms, such as for example, phenyl, naphthyl and the like. The term "substituted aryl" as used herein includes aryl as defined above in which one or more of the hydrogen atoms of the aryl portion have been substituted by groups such as, halogen, hydroxyl, lower alkyl, trifluoromethyl, amino, substituted amino or lower alkoxy. X, in the formulas below, includes anions such as the halides, for example, fluoride, chloride, iodide, bromide, or other anions such as, sulfate, nitrate, phosphate, maleate, fumarate and the like.

The definitions for $R_1$, $R_2$, $R_3$, $R_4$ and $R_5$, and $n$ as used hereinafter have the same meanings as defined above.

The compounds of this invention exhibit anti-arrhythmic activity, for example, at a dosage of about 2 to 3 mg./kg., body weight in a mammal such as, cats, dogs, monkeys, and the like. In experimentally induced arrhythmia, such as those induced by ouabain, at a dosage of 2 to 3 mg./kg., the compounds of this invention are capable of arresting such arrhythmia. Generally speaking, the compounds of this invention are useful in conditions associated with cardiac arrhythmia. A dosage level of about 1 to 10 mg., several times daily is recommended. This dosage regimen can be varied according to body weight, sex and species of the mammal being treated.

Among the dosage forms which can be used to administer these compounds are, for example, tablets, powders, elixirs, suspensions and the like. These dosage forms are formulated by procedures known to the pharmacist's art.

All the compounds of this invention also exhibit antibacterial activity against gram positive cocci, such as *Staphylococcus aureus* or gram negative bacilli, such as *E. coli*. To use the compounds as anti-bacterials, they are formulated from 1 to 10% by weight with a dermatologically acceptable vehicle, such as talc, petrolatum and applied liberally to the site infected with the susceptible bacteria.

According to the processes of this invention, the above compounds can be prepared by methods depicted as follows:

(A)

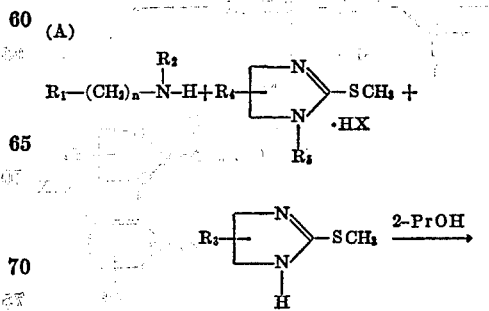

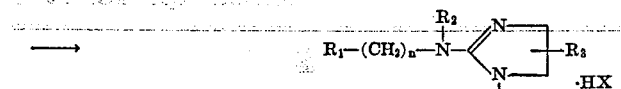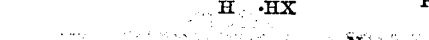

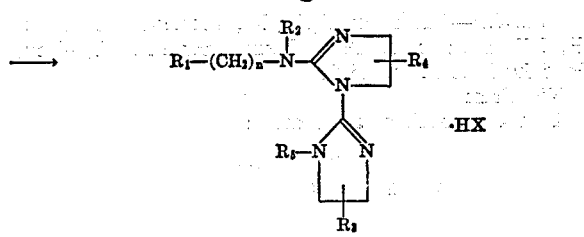

In the above, X is an anion, such as the halides, for example, fluoride, chloride, iodide, bromide, or other anions such as, sulfate, nitrate, phosphate, maleate, fumarate and the like.

Generally speaking, in the above processes identified as (A) to (J), the starting materials are allowed to react together with 2-propanol, preferably under reflux conditions and in the absence of atmospheric air. The resulting compounds are recovered from the reaction mixtures either in the form of free bases or in the form of the HX salts by methods well known to the art, such as for example, recrystallization techniques.

The free base of this invention can be converted to its corresponding pharmaceutically acceptable acid addition salts. Exemplary of nontoxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques.

In the above reaction diagrams (A) to (J), starting amines are known compounds and are commercially available from sources such as Aldrich Chemical Company and they can also be prepared by known methods such as those outlined in Synthetic Organic Chemistry by R. B. Wagner and H. D. Zook, John Wiley & Sons, Inc., New York, N.Y., 1953, p. 653.

The 2-methylmercaptoimidazol-2-ines starting compounds are prepared according to procedures such as those outlined in S. R. Aspinall and E. J. Bianco, J. Org. Chem., 73, 602 (1951), W. Wilson, J. Chem. Soc. 1389 (1955), A. L. Langis and F. Herr, Can. 736,494 (June 14, 1966), C.A. 65, 12212 (1966). The starting triethyl[1-(2-imidazolin-2-yl)-2-imidazolin-2-yl]ammonium iodide hydroiodide methanethiol and 1-(2-imidazolin-2-yl)-2-(methylthio)-2-imidazoline hydroiodide are prepared by the following reaction schemes:

(K)

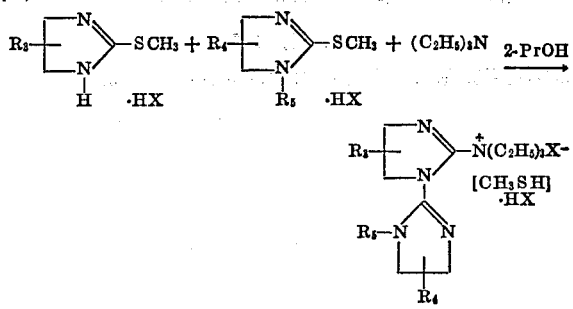

(L)

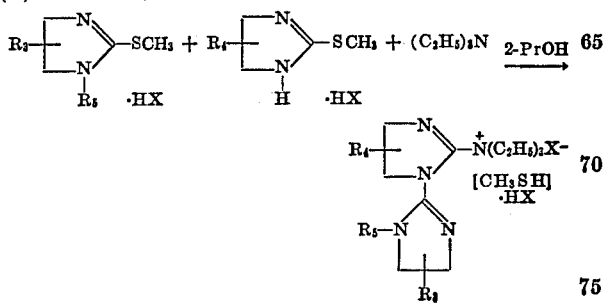

(M)
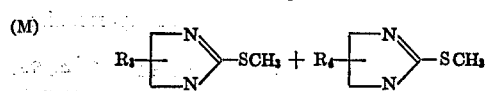

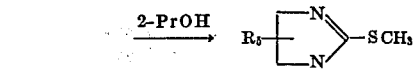

N)
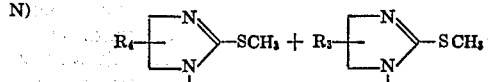

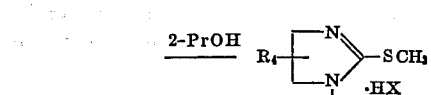

The following examples are included in order further to illustrate the invention.

EXAMPLE 1

1-(2-{[1-(2-imidazolin-2-yl)-2-imidazolin-2-yl]amino}ethyl)indole hydroiodide

A solution of 1-(2-aminoethyl)indole (3.24 g. 0.0200 mole), triethyl[1 - (2-imidazolin-2-yl)-2-imidazolin-2-yl] ammonium iodide hydroiodide methanethiol (9.87 g., 0.0182 mole) and redistilled (from calcium hydride) 2-propanol (50 ml.) was heated under reflux for 30 minutes and allowed to cool to room temperature. The solid was collected. Recrystallization from 90% 2-propanol-water afforded 3.60 g. (42.0%) of the imidazoline hydroiodide, M.P. 228.0–229.0° dec.

Analysis.—Calcd. for $C_{16}H_{21}IN_6$ (percent): C, 45.29; H, 4.99; I, 29.91; N, 19.81. Found (percent): C, 45.38; H, 5.00; I, 29.70; N, 19.60.

EXAMPLE 2

3-(2{[1-(2-imidazolin-2-yl)-2-imidazolin-2-yl]amino}ethyl)indole hydroiodide

A solution of tryptamine (6.40 g., 0.0400 mole), 2-methylmercaptoimidazol - 2 - ine hydroiodide (19.5 g., 0.0800 mole), triethylamine (4.05 g., 0.0400 mole) and 2-propanol (freshly distilled from calcium hydride, 35 ml.) was heated under reflux for two hours and then allowed to cool to room temperature. The solid was collected and recrystallized from 90% 2-propanol-water; yield 3.39 g. (20.0%) of the imidazoline hydroiodide, M.P. 256.0–257.0° dec.

Analysis.—Calcd. for $C_{16}H_{21}IN_6$ (percent): C, 45.29; H, 4.99; I, 29.91; N, 19.81. Found (percent): C, 45.43; H, 4.98; I, 30.03; N, 19.95.

EXAMPLE 3

3-(2-{[1-(2-imidazolin-2-yl)-2-imidazolin-2-yl]amino}ethyl)-5-methoxyindole hydroiodide A solution of 5-methoxytryptamine (5.70 g., 0.0300 mole) 2-methylmercaptoimidazol-2-ine hydroiodide (14.6 g., 0.0600 mole), triethylamine (3.04 g., 0.0300 mole) and freshly distilled (from calcium hydride) 2-propanol (30 ml.) was heated under reflux for two hours and allowed to cool to room temperature. The precipitate was collected and recrystallized from 80% ethanol-water;

yield 2.50 g. (20.0%) of the imidazoline hydroiodide, M.P. 270.0–271.0° dec.

Analysis.—Calcd. for $C_{17}H_{23}IN_6O$ (percent): C, 44.94; H, 5.10; I, 27.93; N, 18.50; O, 3.52. Found (percent): C, 45.00; H, 5.06; I, 28.11; N, 18.55; O, 3.79.

EXAMPLE 4

1-(2-imidazolin-2-yl)-2-(3-indol-3-ylpro-ylamino)-2-imidazoline hydroiodide

A solution of homotryptamine (5.22 g., 0.0300 mole), 2-methylmercaptoimidazol-2-ine (3.48 g., 0.0300 mole), 2 - methylmercaptoimidazol-2-ine hydroiodide (7.32 g., 0.0300 mole), and 2-propanol (distilled from calcium hydride, 70 ml.) was heated under reflux for 1½ hours while a stream of nitrogen was bubbled through the reaction mixture. The solution was allowed to cool to room temperature. The solvent was evaporated. Trituration of the residual oil with 2-propanol (100 ml.) followed by recrystallization from 95% 2-propanol-water afforded 1.95 g. (15%) of the imidazoline, M.P. 160.0–162.0°.

Analysis.—Calcd. for $C_{17}H_{23}IN_6$ (percent): C, 46.58; H, 5.29; I, 28.95; N, 19.17. Found (percent): C, 46.84; H, 5.33; I, 28.85; N, 19.39.

EXAMPLE 5

5-{[1-(2-imidazolin-2-yl)-2-imidazolin-2-yl]amino}indole hydroiodide

A solution of 5-aminoindole (12.6 g., 0.0800 mole), 1 - (2-imidazolin-2-yl)-2-methylthio-2-imidazoline hydroiodide (24.9 g., 0.0800 mole) and 2-propanol (400 ml.) was heated under reflux for two hours during which time a steady stream of nitrogen was bubbled through the reaction mixture. The solution was allowed to cool to room temperature. The precipitate was collected and recrystallized from methanol to give 9.28 g. (29%) of the imidazoline hydroiodide, M.P. 212–214°.

Analysis.—Calcd. for $C_{14}H_{17}IN_6$ (percent): C, 42.44; H, 4.32; I, 32.03; N, 21.21. Found (percent): C, 42.48; H, 4.23; I, 32.29; N, 21.44.

EXAMPLE 6

1-(2-imidazolin-2-yl)-2-{[1-(indol-3-ylmethyl)propyl]amino}-2-imidazoline hydroiodide A sloution of α-ethyltryptamine (8.30 g., 0.0440 mole), 1 - (2-imidazolin-2-yl)-2-methylthio-2-imidazoline hydroiodide (13.8 g., 0.0440 mole), and freshly distilled (from calcium hydride) acetonitrile (150 ml.) was heated under reflux while a steady stream of nitrogen was passed through the reaction mixture. After 103 hours the resultant white precipitate was collected and recrystallized from t-butanol; yield 3.34 g. (16.0%) of the imidazoline hydroiodide, M.P. 205.0–206.0° dec.

Analysis.—Calcd. for $C_{18}H_{25}IN_6$ (percent): C, 47.80; H, 5.57; I, 28.05; N, 18.58. Found (percent): C, 47.89; H, 5.59; I, 28.32; N, 18.53.

We claim:

1. A compound of the formula:

$$R-(CH_2)_n-\underset{H}{\overset{R_1\ H}{C}}-\underset{}{\overset{}{N}}-\begin{array}{c}\text{(imidazoline ring)}\end{array} \cdot HX$$

wherein R is a member selected from the group consisting of (indole, indole, indole, and pyrrole structures)

$R_1$ is a member selected from the group consisting of hydrogen and lower alkyl of 1 to 4 carbon atoms; $n$ is a member selected from the group of 0, 1 and 2; and HX is a member selected from the group consisting of pharmaceutically acceptable acids.

2. A compound according to claim 1 which is 1-(2-{[1-(2-imidazolin-2-yl)-2-imidazolin-2-yl]amino}ethyl)indole hydroiodide.

3. A compound according to claim 1 which is 3-(2-{[1-(2 - imidazolin-2-yl)-2-imidazolin-2-yl]ethyl)indole hydroiodide.

4. 3-(2-{[1-(2 - imidazolin - 2 - yl)-2-imidazolin-2-yl]amino}ethyl)-5-methoxyindole hydroiodide.

5. A compound according to claim 1 which is 1-(2-imidazolin-2-yl)-2-(3-indol - 3 - ylpropylamino)-2-imidazoline hydroiodide.

6. 5 - {[1-(2-imidazolin-2-yl)-2-imidazolin-2-yl]amino}indole hydroiodide.

References Cited

UNITED STATES PATENTS

| | | | |
|---|---|---|---|
| 3,359,274 | 12/1967 | Billinghurst | 260—296 R |
| 3,404,156 | 10/1968 | Archer | 260—309.6 |
| 3,586,695 | 6/1971 | Wysong et al. | 260—309.6 |

FOREIGN PATENTS

| | | | |
|---|---|---|---|
| 416,946 | 1/1967 | Switzerland | 260—309.6 |

NATALIE TROUSOF, Primary Examiner

U.S. Cl. X.R.

260—247.5 R, 293.7, 296 R; 424—248, 263, 267, 273